(12) United States Patent
Barjon et al.

(10) Patent No.: US 11,511,573 B2
(45) Date of Patent: Nov. 29, 2022

(54) DEVICE FOR SECURING AN ELECTRONIC MEMBER TO A TIRE CASING

(71) Applicant: COMPAGNIE GENERALE DES ETABLISSEMENTS MICHELIN, Clermont-Ferrand (FR)

(72) Inventors: Stéphane Barjon, Clermont-Ferrand (FR); Yann Palheire, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 440 days.

(21) Appl. No.: 16/486,718

(22) PCT Filed: Feb. 15, 2018

(86) PCT No.: PCT/FR2018/050363
§ 371 (c)(1),
(2) Date: Aug. 16, 2019

(87) PCT Pub. No.: WO2018/150140
PCT Pub. Date: Aug. 23, 2018

(65) Prior Publication Data
US 2019/0381841 A1    Dec. 19, 2019

(30) Foreign Application Priority Data
Feb. 17, 2017    (FR) ...................................... 1770153

(51) Int. Cl.
*F16M 13/00*    (2006.01)
*B60C 23/04*    (2006.01)
*B29D 30/00*    (2006.01)

(52) U.S. Cl.
CPC .. *B60C 23/0493* (2013.01); *B29D 2030/0072* (2013.01)

(58) Field of Classification Search
CPC ..... B60C 23/0493; F16M 13/00; F16M 11/00
See application file for complete search history.

(56) References Cited

U.S. PATENT DOCUMENTS

| 5,613,819 A | 3/1997 | Wehren |
| 6,309,494 B1 | 10/2001 | Koch et al. |

(Continued)

FOREIGN PATENT DOCUMENTS

| DE | 10 2014 206 463 A1 | 10/2015 |
| EP | 1 598 218 A1 | 11/2005 |

(Continued)

OTHER PUBLICATIONS

International Search Report dated Apr. 25, 2018, in corresponding PCT/FR2018/050363 (4 pages).

*Primary Examiner* — Amy J. Sterling
(74) *Attorney, Agent, or Firm* — Venable LLP

(57) ABSTRACT

A device (10) for securing an electronic component to a wall of a tire comprises a base (11) that is able to be secured to the wall of a tire and a retaining wall (12), connected to the base (11). The interior surfaces (14, 15) of these elements define a volume (13) able to accommodate the electronic member (100). The base (11) has an opening (18) via which the electronic member is introduced so that when the base (11) is secured to the wall of the tire, the opening (18) is closed by the wall of the tire. The securing device (10) is such that the retaining wall (12) is able to be torn in order to form a fault that allows the electronic member to be extracted and inserted, and such that the retaining wall (12) has a retaining device (19) for a clamping system (20) for clamping the retaining wall (12).

16 Claims, 2 Drawing Sheets

(56) References Cited

U.S. PATENT DOCUMENTS

| | | |
|---|---|---|
| 6,952,955 B1 | 10/2005 | Uleski |
| 7,347,088 B2 | 3/2008 | Shimura |
| 8,578,767 B2 * | 11/2013 | Dussinger .......... B60C 23/0493 73/146.5 |
| 9,834,044 B2 | 12/2017 | Luce |
| 10,071,606 B2 | 9/2018 | Hartmann et al. |
| 2006/0059982 A1 | 3/2006 | Shimura |
| 2006/0220816 A1 * | 10/2006 | Scheungraber .. G06K 19/07764 340/447 |
| 2006/0243043 A1 * | 11/2006 | Breed ................... B60C 23/041 73/146 |
| 2009/0101257 A1 | 4/2009 | Brusarosco et al. |
| 2009/0173422 A1 * | 7/2009 | Utsumi ............... B60C 23/0493 152/510 |
| 2009/0183562 A1 * | 7/2009 | Brusarosco ......... B60C 23/0493 73/146.5 |
| 2009/0211352 A1 * | 8/2009 | Hatanaka ............. G01D 11/245 73/146 |
| 2010/0186493 A1 | 7/2010 | Brusarosco et al. |
| 2011/0315292 A1 | 12/2011 | Gougnaud |
| 2014/0352420 A1 | 12/2014 | Brusarosco et al. |
| 2016/0053925 A1 | 2/2016 | Dohi et al. |
| 2016/0229237 A1 | 8/2016 | Luce |
| 2017/0015152 A1 | 1/2017 | Hartmann et al. |
| 2017/0355237 A1 | 12/2017 | Agarwal et al. |
| 2018/0038770 A1 | 2/2018 | Osawa et al. |
| 2018/0361804 A1 | 12/2018 | Wei et al. |
| 2019/0176547 A1 | 6/2019 | Sakakibara |
| 2020/0055354 A1 | 2/2020 | Barjon et al. |

FOREIGN PATENT DOCUMENTS

| | | |
|---|---|---|
| EP | 3020577 A1 | 5/2016 |
| WO | 2013/098711 A1 | 7/2013 |

* cited by examiner

DEVICE FOR SECURING AN ELECTRONIC MEMBER TO A TIRE CASING

FIELD OF THE INVENTION

The present invention relates to a device for securing to a tyre casing an electronic member concerned with measuring parameters pertaining to the tyre casing.

TECHNOLOGICAL BACKGROUND

The development of electronic units integrated into mounted assemblies, comprising a tyre casing and a wheel, has intensified over the last few years. In effect, these electronic units measure parameters pertaining to the mounted assembly such as the temperature or inflation pressure inside the cavity formed by the tyre casing and the wheel rim in a mounted, inflated state. These parameters are essential to safe use of the mounted assembly. The functionalities offered by these electronic members are now starting to increase, thereby increasing the number of parameters taken into consideration. Communication with these electronic units, in particular in order to communicate the parameters of the mounted assembly, is generally achieved by way of radiofrequency transmission to transmitter/receiver devices.

These new functionalities mean that new services that can be offered to the end-customer can now be developed. The quality of the services offered depends greatly on the quality of the parameters measured and transmitted. Naturally, the quality of the measurement taken is very closely linked with the structural and functional components of the electronic member. As a result, it is essential to take the inviolability of this electronic member into consideration in order to assure the quality of the services offered therewith.

This electronic member may be small enough that it can be integrated into the very structure of a tyre casing, being, for example a passive RFID (Radio Frequency Identification) transponder. However, in most cases, these electronic members are active members and are attached to the components of the mounted assembly using a securing device. As a result, the inviolability of the electronic member is then assured primarily by the inviolability of the securing device that attaches the electronic member to the tyre casing in particular.

Document EP3020577A1 describes a flexible receptacle enveloping an electronic member. The electronic member is introduced into the receptacle via an opening in the base of the receptacle, which is fixed to the wall of the tyre casing. Thus, when the receptacle is in place on the wall of the tyre casing, the electronic member is no longer accessible, and inviolability is thus assured. However, maintenance operations on the electronic member may be needed, in order for example to change the battery of the electronic member or perform a technical update on the electronic member. An opening on the non-fixed part of the receptacle, using solutions of the Velcro type, is therefore envisaged. However, that then means that the inviolability of the securing device is no longer assured.

It is one of the objects of the following invention to address the problems of the inviolability of these securing devices while at the same time allowing the electronic member of the securing device to be changed, and maintaining a compromise with the other functionalities of the securing device such as, for example, the thermomechanical endurance of the securing device, the endurance of the tyre casing, and the effectiveness of the radiofrequency communication of the electronic member.

In order to gain a better understanding of the invention, what is meant here by the circumferential S, axial A and radial R directions, are directions defined with respect to the rotating frame of reference of the tyre casing about its natural axis of rotation. The radial direction R is the direction extending away from the natural axis of rotation and perpendicularly thereto. The axial direction A is the direction parallel to the natural axis of rotation. Finally, the circumferential direction S forms a direct trihedron with the predefined radial and axial directions.

SUMMARY OF THE INVENTION

The invention relates to a device for securing an electronic component to a wall of a tyre casing, comprising a base that is able to the secured to the wall of the tyre casing and a closed retaining wall, connected to the base and, with the base, defining a volume. The closed volume defined by the interior surfaces of the base and of the retaining wall is able to accommodate the electronic member. The base has an opening via which the electronic member can be introduced so that when the base is secured to the wall of the tyre casing, the opening is closed by the wall of the tyre casing. This securing device is characterized in that the retaining wall is able to be torn in order to form at least one fault that allows the electronic member to be extracted and inserted, and in that the retaining wall on its external surface has at least one retaining device for a clamping system for clamping the retaining wall.

First of all, the securing device is defined according to two distinct operating configurations. In the first configuration, the retaining wall remains closed, which means to say faultless. In this state, the inviolability of the securing device containing the electronic member is assured when this device is set in place on a tyre casing. Effectively, there is no access available for extracting the electronic member initially set in place through the opening in the base, nor for inserting a new electronic member when the device is secured to the wall of the tyre casing. Any extraction of the electronic member would entail at least partially detaching the base, or damaging the securing device. Such acts are clearly visible. In addition, optionally, the presence of a clamping system clamping the wall and held in place by the retaining device allows the electronic member to be held in place in the securing device. Thus, in this configuration of the securing device, the risk of inadvertent ejection of the electronic member through the opening in the base in the event of at least partial detachment of the base from the wall of the tyre casing is nullified. The presence of the clamping system held in place on the securing device prevents any relative movement of the electronic member with respect to the securing device and therefore inadvertent ejection thereof.

In the second operating configuration of the securing device, in which the retaining wall has a fault generated by the deliberate tearing of the retaining wall, it is possible to extract the electronic member initially present and to insert another one while keeping the securing device attached to the wall of the tyre casing. The inviolability of the securing device thus attached to the wall of the tyre casings ensured, on the one hand, by the single-use clamping system that clamps the retaining wall and, on the other hand, by the retaining device for this clamping system, which is present on the retaining wall. However, the clamping system has to be a single-use system. Specifically, what is meant here by "single-use clamping system" is that removal of the clamping system can be performed only with at least partial destruction thereof. Thus, any violation of the securing system is clearly visible through the at least partial destruction of the clamping system. Furthermore, the clamping system that clamps the retaining wall while preventing the extraction or insertion of the electronic member, also makes it possible to limit the risk of inadvertent ejection of the electronic member from the securing device. Effectively, by limiting the volume available during movements of the parts separated by the fault in the retaining wall, the ejection of the electronic member becomes impossible.

A fixed and local second frame of reference is defined here, this one associated with the securing device, and in which the vertical direction W is the direction perpendicular to the external surface of the base connected to the wall of the tyre casing. The longitudinal U and transverse V directions are mutually perpendicular and form a direct trihedron with the vertical direction W.

Advantageously, the retaining wall comprises on its external surface at least one partially continuous groove which serves to guide the fault.

These means for guiding the fault are intended, on the one hand, to facilitate tearing and, on the other hand, to make the tearing predictable and nonrandom. Thus, the fault in the retaining wall is confined to the minimum necessary for extracting and inserting an electronic member. These means are continuous or discontinuous grooves, regardless of the nature of the cross section of the groove, including triangular, rectangular, polynomial, with continuous curvature, circular, elliptical. Of course, the cross section may also be a combination of these features. Thus, the tearing and guiding of the fault in the retaining wall are facilitated by the technical characteristics of the groove.

According to one particular embodiment, the retaining wall comprises N through-orifices, N being greater than or equal to 2.

These orifices that pass through the wall have a first role of placing the volume of the internal cavity of the mounted assembly, as delimited by the wheel and the tyre casing, in communication with the internal volume of the securing device. Thus, the physical parameters such as the pressure and the temperature are equalized between the internal cavity of the mounted assembly and the volume of the securing device. As a result, the sensors of the electronic member which are situated inside the volume of the securing device and measure such parameters, give reliable information as to the parameters pertaining to the mounted assembly.

In addition, these through-orifices may also serve as stopping points that halt the tearing of the retaining wall. In that case, they may for example be situated at the ends of the tear guiding means.

According to one very particular embodiment, the through-orifices have a cross section with continuous curvature.

The continuity of the curvature of these orifices encourages uniformity of the mechanical stresses on the contour of the orifice making it possible to limit excessively high stress concentrations. As a result, the risk of initiating a tear in the retaining wall on the contour of these orifices is limited.

According to one very particular embodiment, any point on the cross section of the through-orifices has a radius of curvature greater than or equal to 1 millimetre.

The orifice is of significant size so that it can act as an effective stopping point, halting the fault and therefore the tear in the retaining wall. In a first scenario in which the width of the fault is smaller than the dimension of the orifice for example of 1 millimetre, the fault opens into the larger-sized orifice thereby reducing the mechanical stresses by spreading them uniformly over a larger surface. In a second scenario in which the fault has a width that is greater than the main dimension of the orifice, the end of the fault, which is potentially in the form of an isolated point before it opens into the orifice, becomes a surface with continuous curvature, thus reducing the mechanical stresses. However, in this second scenario, the reduction in mechanical stresses is not as great as in the first scenario.

According to one preferred embodiment, with the volume housing the electronic member positioned in the securing device being inscribed inside a right cylinder that is upright about an axis, referred to as the reference axis, of height 2H with respect to the interior surface of the base, and of diameter 2R, the interior ends of at least K through-orifices, K being strictly less than N, are situated at a distance greater than R away from the reference axis and at a vertical distance less than H away from the interior surface of the base.

The K through-orifices are stopping points that halt the fault in the retaining wall of the securing device. These stopping points are sufficiently radially spaced away from the reference axis of the electronic member that this electronic member can be extracted from or inserted into the securing device. Of course, the vertical position with respect to the interior surface of the base of the securing device facilitates these extraction or insertion operations by limiting how much of the electronic member is truly anchored in the securing device. Finally, these orifices act as a natural hinge for those parts of the retaining wall which are separated by the fault in the second configuration, thus facilitating the operations of extracting and inserting the electronic member with respect to the securing device.

Advantageously, the retaining device for the clamping system that clamps the retaining wall comprises an element comprised in the group including grooves and channels.

Thus, the retaining device allows the clamping system to be housed in complete security. In the case of a groove, positioning the clamping system vertically lower than the groove makes natural removal of the clamping system impossible. In the case of a channel, fitting the clamping system in the channel prevents natural removal of that system.

According to one specific embodiment, the retaining device for the clamping system that clamps the retaining wall is partially continuous.

Thus, there is no need, even if such a measure is recommended, for the retaining device to be continuous in order to perform its function of holding the clamping system in place. For example, it is enough for it to be continuous in parts in order for it to perform its function.

According to a very specific embodiment, with the volume housing the electronic member positioned in the securing device being inscribed inside a right cylinder that is upright about an axis, referred to as the reference axis, of height 2H with respect to the interior surface of the base, and of diameter 2R, the retaining device for the single-use clamping system that clamps the retaining wall extends circumferentially about the reference axis over an angular sector of at least 90 degrees, preferably over an angular sector of at least 180 degrees.

Ensuring that at least one quarter of the periphery of the retaining device is effective within the securing device is enough to ensure the functionality of holding the clamping system on the securing device. Of course, if half the clamping system that clamps the retaining wall is anchored, the mechanical fatigue strength of the retaining device and of the clamping system are improved through better distribution of the mechanical stresses. The ideal solution is even distribution of the retaining device over the full periphery of the securing device.

According to one preferred embodiment, with the volume housing the electronic member positioned in the securing device being inscribed inside a right cylinder that is upright about an axis, referred to as the reference axis, of height 2H with respect to the interior surface of the base, and of diameter 2R, the retaining device for the single-use clamping system that clamps the retaining wall is situated at a radial distance greater than or equal to R away from the reference axis and at a vertical distance greater than or equal to H away from the interior surface of the base.

Thus it is assured that the retaining device lies on the upper part of the electronic member, making it possible to perform an effective action of retaining the electronic member by clamping the retaining wall onto this member. As a result, the risk of inadvertent ejection of the electronic member from the securing device through the fault in the retaining wall is limited. Likewise in the case of the initial configuration of the faultless securing device on the retaining wall, the use of a clamping system and of the retaining device thus positioned limits the relative movements of the electronic member with respect to the securing device, thereby improving the mechanical life of the electronic member and of the securing device.

In one preferred embodiment, the retaining device for the clamping system that clamps the retaining wall comprises a cavity able to house at least part of the single-use clamping system that clamps the retaining wall.

Thus, the retaining device comprises a dedicated housing to accommodate the clamping system. For preference, the cross section of this cavity has a continuous curvature. This cavity represents a natural hinge for enlarging the open section offered by the fault during operations of inserting and of extracting the electronic member by increasing the range of travel of the parts above the retaining device of the retaining wall. Finally, the presence of the clamping system in this cavity increases the area of contact between the retaining device and the clamping system, thus minimizing the mechanical stresses associated with the contact forces. The mechanical integrity of the various elements is thereby improved notably in the case of a cavity and clamping system having a cross section with continuous curvature.

According to a highly preferred embodiment, the cavity of the retaining device for the clamping system that clamps the retaining wall has a cross section that accommodates at least 40% of the cross section of the clamping system.

Thus, a not-insignificant proportion of the clamping system perfectly occupies the volume offered by the retaining device. On the one hand, this prevents the clamping system from being mechanically removed without damaging the surrounding elements. And on the other hand, it greatly reduces the functionality of the mechanical hinge afforded by the cavity, thus limiting the risk of the electronic member being ejected through the fault in the second operating configuration.

Advantageously, the contour of the opening in the base comprises an inwardly-extending rim, creating a narrowing for the purposes of holding the electronic member inside the closed volume, and a spacing defining a space E between the electronic member and the wall of the tyre casing. The distance E is greater than or equal to 2 millimetres and less than or equal to 4 millimetres.

The first functionality of this rim is to keep the electronic member inside the securing device in the event of a break in the connection between the external surface of the base and the wall of the tyre casing. Without external mechanical action, the electronic member finds itself trapped inside the securing device. In addition, mechanical decoupling between the tyre casing and the electronic member is assured and this makes it possible to minimize the transmission of energy, in exceptional events such as knocks experienced by the tyre casing, towards the electronic member. In addition, that also makes it possible to minimize the extent to which the electronic member and the wall of the tyre casing rub against each other. That improves the life of the electronic member and of its components.

According to one highly preferred embodiment, the base of the securing device comprises at least one marker situated on the vertically upper part of the base.

The presence of this marker allows the securing device to be orientated correctly with respect to the wall of the tyre casing in instances in which the functionalities of the electronic member require this, such as, for example, the various components of acceleration in preferred directions of the tyre casing.

These markers, which are visible geometric details, are comprised within the group including lug, notch, boss, recess. These markers are readily identifiable using an optical camera looking from above, the face of the securing device being visually accessible, allowing the operation of placing the securing device on the wall of the tyre casing to be automated.

Advantageously, the securing device is made using an elastomer material.

The hyperelasticity properties of elastomer materials encourage elastic deformation of the securing device allowing the electronic member to be inserted and extracted with respect to the securing device. In addition, because the wall of the tyre casing is generally not planar, the elasticity of this material makes it possible to create an effective surface for bonding between the base and the wall of the tyre casing.

Among elastomer materials, rubber compounds based on saturated or unsaturated diene elastomers such as butyl, SBR, polybutadiene; natural rubber; and polyisoprene are good candidates because of their compatibility with the rubber compounds of the tyre casing. The advantage of butyl is that it has an excellent resistance to oxidation. It is also possible to use as elastomer an EPDM (ethylene propylene diene monomer rubber).

Finally, these rubber compounds do not impair the radiofrequency communication performance of the electronic members because they are natural electrical insulators the insulating property of which can be adjusted through the use of greater or lesser amounts of conducting reinforcing fillers.

According to one preferred embodiment in which the fault is formed, defining a lip on each disjointed part of the retaining wall, the securing device comprises a single-use clamping system able to bring together the lips of the fault at the retaining device.

Specifically, the retaining device on the retaining wall, accommodating the clamping system, has the fault passing through it at least at one geometric point. The positioning of the retaining device therefore tends to minimize the open section offered by the unfurling of the separated parts of the retaining wall. As a result, the ability of the retaining wall to unfurl and open out is thereby lessened. In the presence of the clamping system, it becomes impossible to extract and insert the electronic member through the fault. It is absolutely essential to use a single-use clamping system in order to be able to verify the inviolability of the securing device in this second operating configuration.

According to a very preferred embodiment, the single-use clamping system that clamps the retaining wall comprises a tightenable ring.

Thus, the clamping system is single-use because the ring is naturally closed and removing it entails breaking the ring at least at one point in order to increase its development to allow the retaining device to be freed. As a preference, the cross section of the ring has continuous curvature making it possible to limit the discontinuities that introduce stress concentrations both into the clamping system and into the parts in contact, with a tendency to reduce the life of the ring and of the retaining wall.

BRIEF DESCRIPTION OF THE DRAWINGS

The invention will be better understood upon reading the following description, given solely by way of nonlimiting example and with reference to the appended figures, throughout which the same reference numerals denote identical parts, and in which.

DETAILED DESCRIPTION OF EMBODIMENTS

Figure 1:
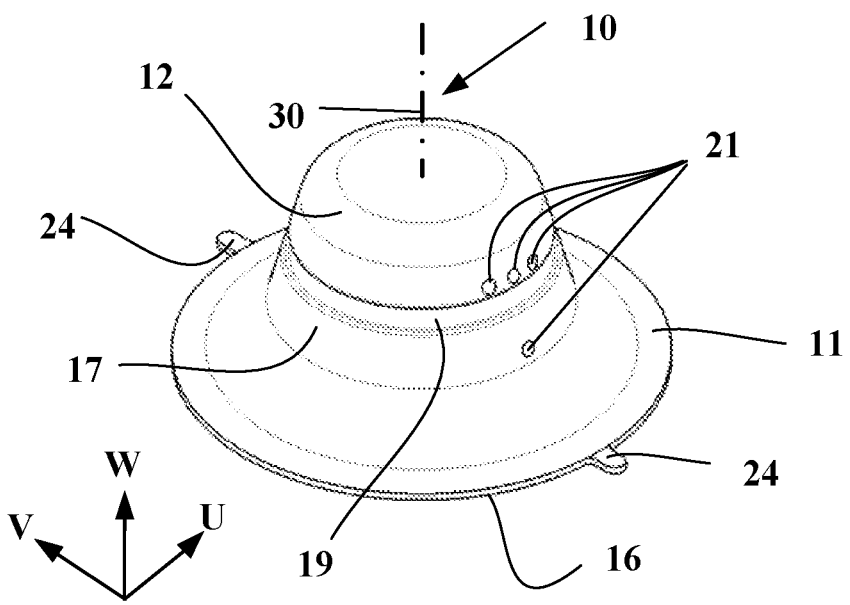
FIG. 1 is a perspective view of a securing device according to the invention in its first operating configuration.

FIG. 1 shows a securing device 10 for securing an electronic member of the TMS (Tyre Mounted System) type in a material comprising one or more compounds selected from the group comprising natural rubber, polyisoprene, polybutadiene, SBR, butyl, ethylene propylene diene monomer. These compounds, formulated with non-conducting fillers or with low conducting-filler contents, allow the electronic member a sufficient radiofrequency communication performance in the UHF (ultrahigh frequency) bands. In addition, these compounds have natural flexibility, allowing the securing device to deform elastically. This securing device 10 comprises a base 11 and a retaining wall 12 which together constitute the securing device 10. The securing device 10 here is in its first operating configuration in which the retaining wall 12 constitutes a closed surface. The device has an axis of rotation 30 defining the vertical direction W in the local frame of reference of the securing device 10.

The base 11 is equipped with an opening that has allowed the electronic member to be introduced into the securing device 10. At the external surface 16 of the base 11, the securing device 10 is able to be secured to the wall of tyre casing via standard means of securing elastomer products of the MS-polymer (which stands for silyl-modified polyether), MS PDMS (which stands for silyl-modified Polydimethylsiloxane) adhesive, double-sided sticky tape or tie-gum type. Finally, the vertically upper part of the base with respect to the external surface of the base here comprises, by way of markers 24, two rounded lugs situated diametrically opposite each other and extending radially outwards from the base 11. The direction parallel to alignment of the markers 24 corresponds to the transverse direction V in the local frame of reference. Finally, the longitudinal direction U of the local frame of reference is a direction perpendicular to the alignment of the markers 24. These markers 24 allow the securing device 10 and, therefore, the electronic member, to be positioned within the tyre casing. These markers 24 are essential if the electronic member makes it possible, for example, to make a distinction between physical parameters of the mounted assembly in the axial A and circumferential S directions of the mounted assembly in instances in which the securing device 10 is placed in line with the tread of the tyre casing.

The retaining wall 12 here comprises several cylindrical orifices 21 joining the external surface 17 of the retaining wall 12 to the internal surface thereof. These orifices 21 establish fluidic communication between the volume of the mounted assembly and that contained within the securing device 10. The retaining wall 12 is able to be torn in order to form a fault dividing the retaining wall 12 into at least two distinct parts making it possible to obtain the second operating configuration of the securing device 10. The structural and material flexibility of the retaining wall 12 allows it to be torn using an object comprising at least one cutting blade.

Finally, the retaining wall 12 of the securing device 10 is equipped with a channel 19 that acts as a retaining device for a clamping system of the ring type, not depicted. Specifically, when the securing device 10 is in the first configuration, the clamping system is optional because it is impossible to extract the electronic member through the retaining wall 12, the clamping system then having the essential function of holding the electronic member and the retaining wall 12 together. This retention thus limits possible knocks to the electronic member during movement between the two elements and damage brought about by these knocks to the internal surfaces of the base 11 and of the retaining wall 12.

Figure 2:
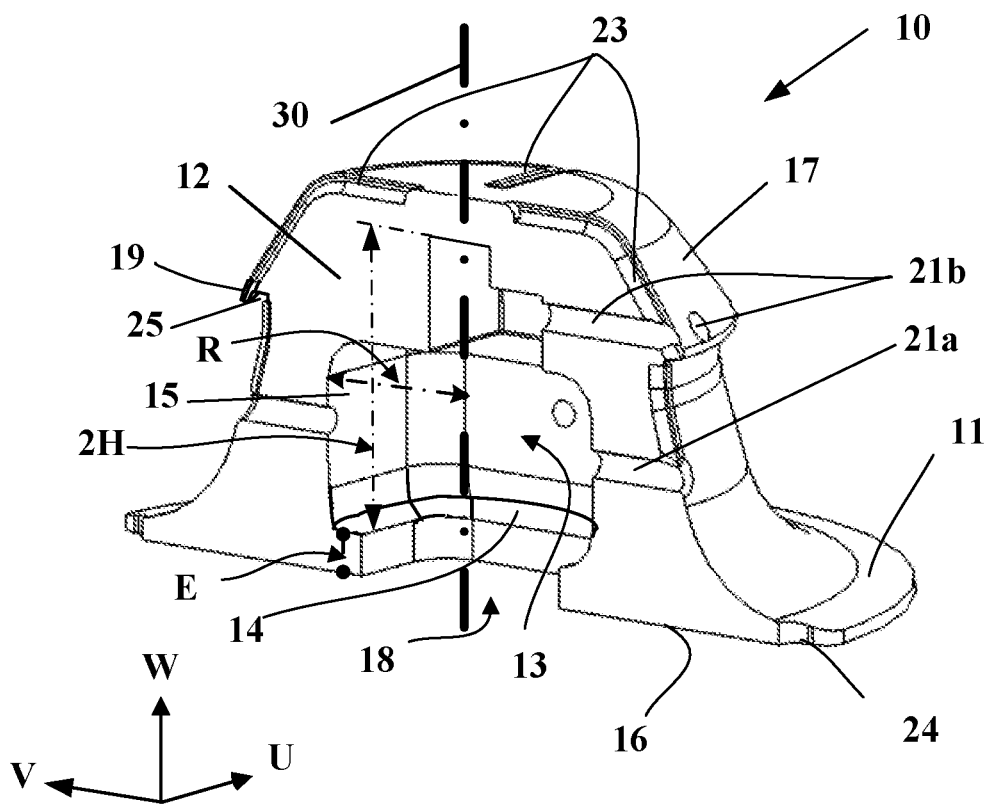
FIG. 2 is a view in perspective and in cross section of a securing device comprising four discontinuous grooves forming a guide for the fault according to the invention.

FIG. 2 shows another securing device 10 able to be secured to a wall of a tyre casing using standard means for securing elastomer products. The securing device 10 comprises, on the one hand, a base 11 and a retaining wall 12. The base 11 acts as the securing interface via its external surface 16. An opening 18 passes through the base 11, from the external surface 16 towards the internal surface 14 and it is via this opening that the electronic member is introduced into the volume 13 of the securing device 10. The opening 18 has, on its periphery, a rim creating a narrowing of the opening 18. This narrowing prevents the electronic member from being extracted effortlessly when this member is inside the volume 13 of the securing device 10. This lip also creates a spacing E between the internal 14 and external 16 surfaces of the base. Thus, there is mechanical decoupling between the electronic member resting on the internal surface 14 of the base 11 and the tyre casing present at the external surface 16 thereof. In this instance, the space E is of the order of 3 millimetres.

The volume 13 is delimited by the internal surface 14 of the base 11 and the internal surface 15 of the retaining wall 12. This volume 13 is able to accommodate the electronic member in a configuration that may or may not involve clearance. Thus, the volume 13 is also inscribed inside the cylinder circumscribing the electronic member about an axis of rotation 30. The term vertically upper part of the retaining wall is used hereinafter to refer to any material point situated at a vertical distance H with respect to the internal surface 14 of the base 11. The other part of the retaining wall 12 will be incorporated into the vertically lower part.

Several orifices pass through the retaining wall 12 from the external surface 17 to the internal surface 15 belonging to the group of orifices 21*a* or 21*b*. The orifices 21*b* allow the fluid external to the securing device 10 to be placed in communication with the fluid contained in the volume 13. It will be noted that these orifices are situated at a vertical distance away from the internal surface 14 of the base that is greater than H, whereas the orifices in the group 21*a* are situated below this vertical distance. In contrast, all the orifices 21 have an opening onto the outside of the securing device 10 that is situated at a radial distance away from the reference axis 30 that is greater than R.

In addition, the retaining wall 12 on its external surface 17 has a radially outer rib 19 positioned in the vertically upper part of the retaining wall 12 which acts as a retaining device 19 for a single-use clamping system that clamps the retaining wall. This retaining device 19 is positioned radially with respect to the reference axis 30 at a distance greater than R. This radial positioning makes it possible, when the securing device 10 is in its second operating configuration, for the retaining wall 12 to unfurl enough that the electronic member can be extracted and inserted with respect to the volume 13 internal to the securing device 10. This rib is equipped here with a cavity 25 on its vertically lower part, to accommodate the single-use clamping system, if any. This cavity 25 acts as a hinge between that part of the retaining wall 12 that is situated vertically above the rib and that part of the retaining wall that is situated vertically below the rib in the absence of a single-use clamping system. This hinge facilitates the unfurling of the disjointed parts of the retaining wall 12 when the device is in its second operating configuration.

The external surface 17 of the retaining wall 12 also has grooves 23, in this example four, evenly distributed on the full periphery of the securing device 10. These grooves 23 are directed in the mainly vertical direction W and have a circular cross section. These grooves 23 serve to guide the cutting tool when the fault dividing the retaining wall 12 into four parts is being created. These grooves 23 here in their lower part end in orifices 21*a* passing through the wall. These circular orifices 21*a* therefore serve as stopping points halting the tearing of the retaining wall 12, limiting the mechanical stress concentrations at the end of the fault. In addition, these orifices are also excellent hinges about which the disjointed parts of the retaining wall 12 can naturally move when the securing device 10 passes into its second operating configuration.

Figure 3:
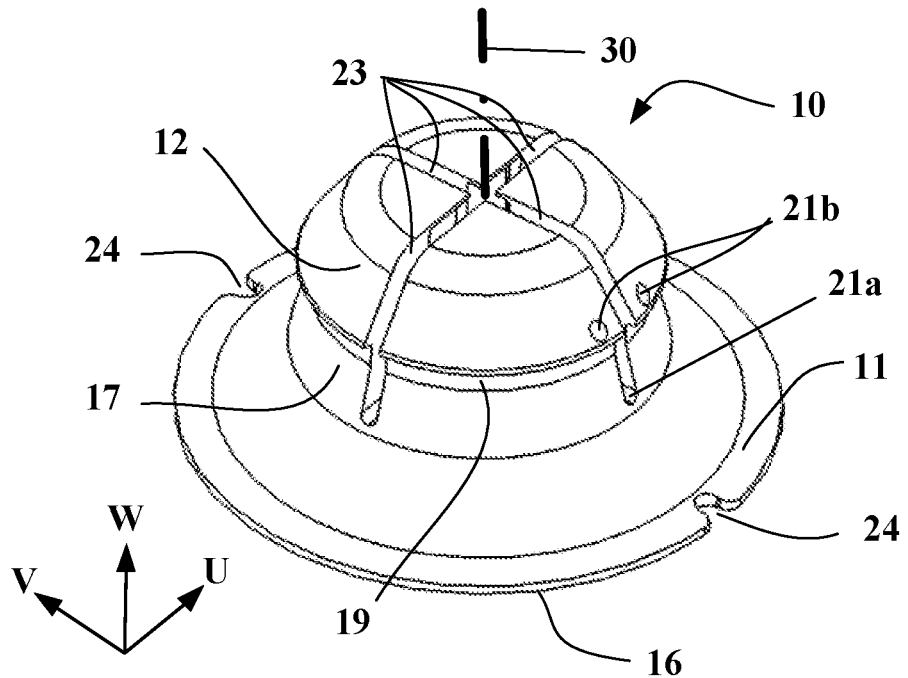
FIG. 3 is a perspective view of a securing device in its second operating configuration in which the fault is made up of two continuous grooves according to the invention.

FIG. 3 is a perspective view of the securing device 10 of FIG. 2 in its second operating configuration. This device has a reference axis 30 that allows the securing device 10 to be orientated correctly with respect to the wall of the tyre casing. As an indirect consequence of this, the electronic member is positioned with respect to the tyre casing. In addition, the base 11 of the securing device 10 has diametrically opposite markers 24 in the form of a notch allowing angular positioning of the securing device 10 with respect to the wall of the tyre casing. In other forms of base 11 which do not have an axis of rotation, such as a diamond-shaped base, these markers 24 could, for example, be geometric details of the base 11, such as the corners of the diamond.

The external surface 16 of the base 11, which acts as an interface for connection with the wall of the tyre casing, is clearly distinguished. The flexible nature of the material of the securing device 10 allows the external surface 16 of the base 11 to conform to the surface of the wall of the tyre casing so as to form an effective bond between the two elements.

The retaining wall 12 firmly attached to the base 11, has a fault formed from the four grooves 23 initially present on the external surface 17 of the retaining wall 12. The retaining wall 12 also comprises, on its vertically upper part, a retaining device 19. The fault here has the same width as the groove 23, namely of the order of 2 millimetres. The single-use clamping system is not depicted in this figure. The retaining device 19 takes the form of a discontinuous rib exhibiting symmetry of revolution about the axis of rotation 30. The discontinuities in the rib were created at the moment of creation of the fault using the cutting tool. These discontinuities are situated vertically in line with the grooves 23.

The fault allows the vertically upper part of the retaining wall 12 to be opened out by means of four disjointed structures of the retaining wall 12. These disjointed parts of the retaining wall 12 are able to pivot radially at the level of the cavity of the retaining device 19. In addition, these disjointed structures may also pivot circumferentially at the level of the ends of the fault which ends consist of certain orifices 21*a*. These two rotations make it possible to open up enough space in the vertically upper part of the retaining wall 12 that the steps of extracting or inserting the electronic member with respect to the internal volume of the securing device 10 can be performed. In addition, the vertical position of the orifices 21*a* that act as the ends of the fault on the one hand make it possible to free up space for handling the electronic member. On the other hand, they also make it possible to limit the mechanical deformations of the base 11, thus making it possible to guarantee that the latter remains attached to the wall of the tyre casing during the phases of handling of the electronic member. Exchanging the electronic member in the securing device 10 takes place on the tyre casing.

Figure 4:
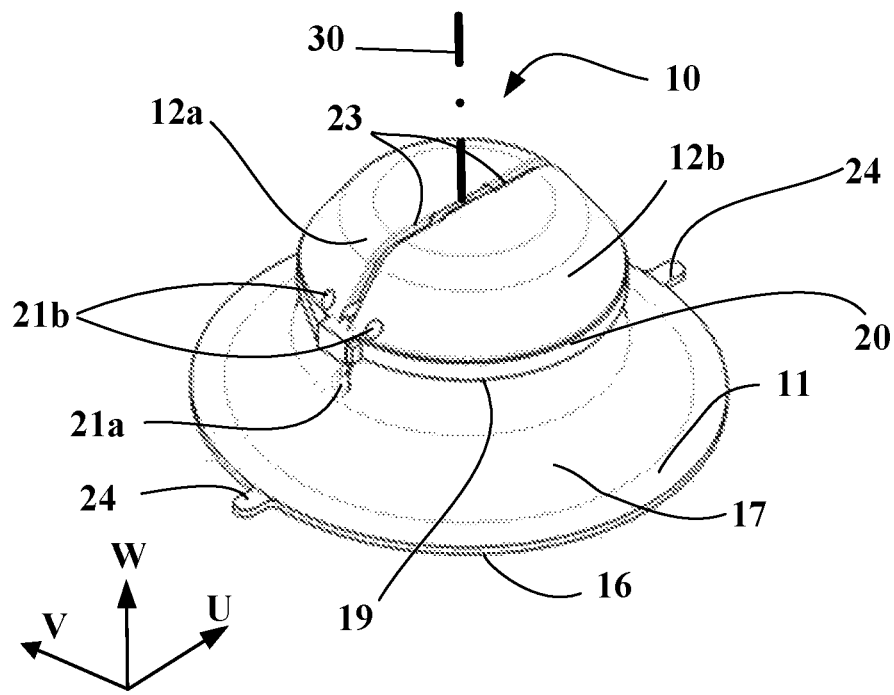
FIG. 4 is a perspective view of a securing device in its second configuration according to the invention in which a single-use clamping system is fitted into the retaining device.

FIG. 4 is a perspective view of a securing device 10 according to the invention in its second operating configuration exhibiting an axis of rotation 30. The securing device 10 comprises a base 11 and a retaining wall which are securely joined together.

The base 11 on its periphery has two markers 24 in the form of lugs positioned in the direction U allowing the securing device 10 to be positioned accurately with respect to the wall of the tyre casing.

The retaining wall is made up of two disjointed structures 12*a* and 12*b* in its vertically upper part. The fault serving to separate its two structures 12*a* and 12*b* is obtained using two grooves 23 which are initially discontinuous in the direction U. The width of the fault here is smaller than the width of the grooves 23. The fault ends in certain of the orifices 21*a* of the retaining wall which are situated in the vertically lower part. The positioning of these orifices 21*a* used as stopping points to halt the fault makes it possible to obtain enough space in the vertically upper part of the retaining wall that the steps of handling the electronic member in the securing device 10 can be performed. This is because these orifices 21*a* act as hinges for the disjointed structures 12*a* and 12*b* of the retaining wall. In addition, the disjointed structures 12*a* and 12*b* may also pivot radially about the cavity of the retaining device 19 of the retaining wall. This is because the retaining device 19 is produced here using a channel of rectangular section that also serves as a cavity to accommodate the single-use clamping system 20.

The single-use clamping system 20 is depicted here as a band of the cable-tie type made from a mixture of rilsan, polyamide or nylon. This band comprises a tie of rectangular section, 3 millimetres long and 1.5 millimetres wide. This band also has a tightening device making it possible on the one hand to reduce the length of the tie and on the other hand to form the ring. The tightening device is used to adjust the diameter of the band so as to fix the relative position of the disjointed structures 12a and 12b of the retaining wall. The free end of the tie after the ring has been formed and adjusted, is cut off flush with the tightening device so that it does not constitute a protruding part for the walls of the tyre casing.

The adjusting of the ring leads to the closing of the fault, namely to the bringing-together of the lips of the fault, initially formed by the cutting tool at the level of the disjointed structures 12a and 12b of the retaining wall. In addition, adjustment of the ring causes the hinge formed by the cavity in the retaining device 19 to be locked in position occupying the volume of this cavity, through use of the single-use clamping system 20. Thus, the pivoting of the disjointed structures 12a and 12b on the part vertically above the retaining device 19 finds itself limited thereby, not allowing the electronic member to be either extracted or inserted with respect to the securing device 10 through the space offered by this pivoting. As a result, the inviolability of the securing device 10 in this second operating configuration is assured. Only removal of the single-use clamping system 20, achieved by at least partially destroying same, contained in the retaining device 19 allows enough space to be created to allow the electronic member to be manipulated. In the case of a band of the cable-tie type, cutting the tie using a cutting blade through the fault or destroying the tightening device allows this cable tie band contained in the channel of the retaining wall to be undone.

Of course, other single-use clamping systems may also be employed, such as, for example, rings made of a thermosetting rubber from the group comprising natural rubber, butyl, nitrile, ethylene propylene diene monomer or made of heat-weldable rubber from the group including polyurethane and polyester.

The invention claimed is:

1. A device for securing an electronic member to a wall of a tire casing, the device, made of elastomer material, comprising:
    a base configured to be secured to the wall of the tire casing;
    a closed retaining wall, connected to the base and, with the base, defining a closed volume defined by interior surfaces of the base and of the closed retaining wall, the closed volume being configured to accommodate the electronic member,
    wherein the base has an opening via which the electronic member can be introduced so that when the base is secured to the wall of the tire casing, the opening is closed by the wall of the tire casing,
    wherein the closed retaining wall is able to be torn with a cutting blade in order to form at least one fault that allows the electronic member to be extracted and inserted, and
    wherein the closed retaining wall, on an external surface, has at least one retaining device configured to accommodate a clamping system for clamping the closed retaining wall.

2. The device according to claim 1, wherein the closed retaining wall comprises, on the external surface, at least one partially continuous groove which serves to guide the fault.

3. The device according to claim 1, wherein the closed retaining wall comprises N through-orifices, N being greater than or equal to 2.

4. The device according to claim 3, wherein the through-orifices have a cross section with continuous curvature.

5. The device according to claim 4, wherein any point on the cross section of the through-orifices has a radius of curvature greater than or equal to 1 mm.

6. The device according to claim 3, wherein, with the closed volume housing the electronic member positioned in the device being inscribed inside a right cylinder that is upright about a reference axis of height 2H with respect to the interior surface of the base and of diameter 2R, the interior ends of at least K through-orifices, K being strictly less than N, are situated at a distance greater than R away from the reference axis and at a vertical distance less than H away from the interior surface of the base.

7. The device according to claim 1, wherein the at least one retaining device is a groove or a channel.

8. The device according to claim 1, wherein the at least one retaining device is partially continuous.

9. The device according to claim 1, wherein, with the closed volume housing the electronic member positioned in the device being inscribed inside a right cylinder that is upright about a reference axis of height 2H with respect to the interior surface of the base and of diameter 2R, the at least one retaining device extends circumferentially over an angular sector of at least 90 degrees about the reference axis.

10. The device according to claim 1, wherein, with the closed volume housing the electronic member positioned in the device being inscribed inside a right cylinder that is upright about a reference axis of height 2H with respect to the interior surface of the base and of diameter 2R, the at least one retaining device is situated at a radial distance greater than or equal to R away from the reference axis and at a vertical distance greater than or equal to H away from the interior surface of the base.

11. The device according to claim 1, wherein the at least one retaining device comprises a cavity configured to house at least part of the clamping system that clamps the closed retaining wall.

12. The device according to claim 11, wherein the cavity of the at least one retaining device has a cross section that accommodates at least 40% of the cross section of the clamping system.

13. The device according to claim 1, wherein, with a rim bordering the opening of the base extending inwardly to create a narrowing for the purpose of retaining the electronic member in the closed volume and a spacing defining a space E between the electronic member and the wall of the tire casing, the distance E is greater than or equal to 2 mm and less than or equal to 4 mm.

14. The device according to claim 1, wherein the base comprises at least one marker situated on a vertically upper part of the base.

15. The device according to claim 1, wherein, with the fault being formed and defining a lip on each disjointed structure of the closed retaining wall, the device comprises a single-use clamping system able to bring together the lips of the fault at least at the at least one retaining device.

16. The device according to claim 15, wherein the single-use clamping system comprises a tightenable ring.

* * * * *